(12) United States Patent
Shan et al.

(10) Patent No.: US 9,282,256 B1
(45) Date of Patent: Mar. 8, 2016

(54) SYSTEM AND METHOD FOR HDR IMAGING

(71) Applicant: OmniVision Technologies, Inc., Santa Clara, CA (US)

(72) Inventors: Jizhang Shan, Cupertino, CA (US); Eiichi Funatsu, San Jose, CA (US); Yiu Fai Wong, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/579,941

(22) Filed: Dec. 22, 2014

(51) Int. Cl.
*H04N 5/243* (2006.01)
*H04N 5/265* (2006.01)
*H04N 5/235* (2006.01)
*H04N 5/232* (2006.01)

(52) U.S. Cl.
CPC ......... *H04N 5/2355* (2013.01); *H04N 5/23254* (2013.01)

(58) Field of Classification Search
CPC ..... H04N 5/243; H04N 5/2621; H04N 5/265; H04N 5/23232
See application file for complete search history.

(56) References Cited

U.S. PATENT DOCUMENTS

| | | | | |
|---|---|---|---|---|
| 2006/0187311 | A1* | 8/2006 | Labaziewicz | H04N 5/2254 348/218.1 |
| 2010/0085422 | A1* | 4/2010 | Yamashita | G06T 7/003 348/36 |
| 2014/0340538 | A1* | 11/2014 | Muukki | H04N 5/23235 348/218.1 |

OTHER PUBLICATIONS

Mase, M. et al., "A Wide Dynamic Range CMOS Image Sensor With Multiple Exposure-Time Signal Outputs and 12-bit Column-Parallel Cyclic A/D Converters," IEEE Journal of Solid-State Circuits, vol. 40, No. 12, Dec. 2005, pp. 2787-2795.

Oike, Y. et al., "A 121.8dB Dynamic Range CMOS Image Sensor using Pixel-Variation-Free Midpoint Potential Drive and Overlapping Multiple Exposures," Proc. 2007 International Image Sensor Workshop, Jun. 6-10, 2007, Ogunquit, ME, IISW 2007, pp. 30-33.

\* cited by examiner

*Primary Examiner* — Tuan Ho
(74) *Attorney, Agent, or Firm* — Blakely Sokoloff Taylor & Zafman LLP

(57) ABSTRACT

Generating an image with an imaging system includes capturing a first sub-image during a first exposure with a first pixel subset of an image sensor of the imaging system, capturing a second sub-image during a second exposure with a second pixel subset of the image sensor, capturing a third sub-image during a third exposure with a third pixel subset of the image sensor, and capturing a fourth sub-image during a fourth exposure with a fourth pixel subset of the image sensor. The first, second, third, and fourth exposures have different durations. A preferred exposure is selected from between the first, second, third and fourth exposures by analyzing the first, second, third, and fourth sub-images. Then, a full-resolution image is captured at the preferred exposure. An HDR image is generated based on the full-resolution image and the sub-images.

18 Claims, 6 Drawing Sheets

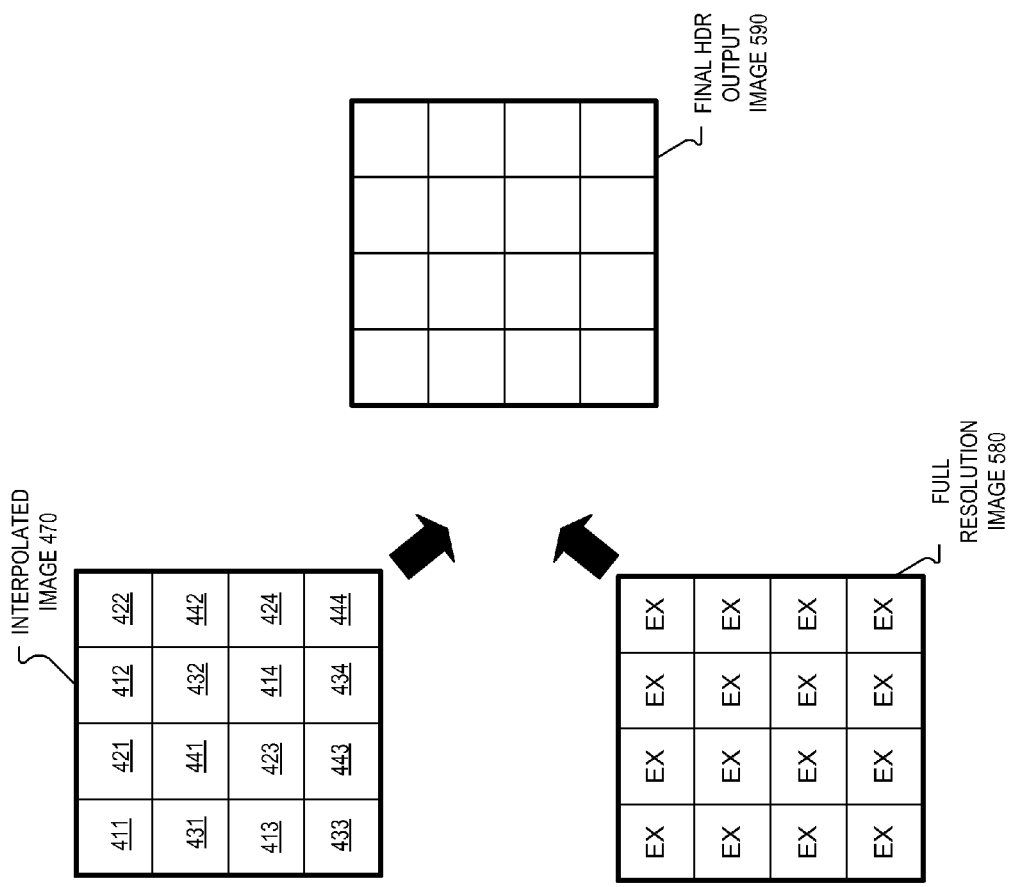

US 9,282,256 B1

SYSTEM AND METHOD FOR HDR IMAGING

TECHNICAL FIELD

This disclosure relates generally to image sensors, and in particular to High Dynamic Range ("HDR") image sensors.

BACKGROUND INFORMATION

High dynamic range ("HDR") image sensors are useful for many applications. In general, ordinary image sensors, including for example charge coupled device ("CCD") and complementary metal oxide semiconductor ("CMOS") image sensors, have a dynamic range of approximately 70 dB dynamic range. In comparison, the human eye has a dynamic range of up to approximately 100 dB. There are a variety of situations in which an image sensor having an increased dynamic range is beneficial. For example, image sensors having a dynamic range of more than 100 dB are needed in the automotive industry in order to handle different driving conditions, such as driving from a dark tunnel into bright sunlight. Indeed, many applications may require image sensors with at least 90 dB of dynamic range or more to accommodate a wide range of lighting situations, varying from low light conditions to bright light conditions.

One known approach for generating an HDR image is to initiate a serial capture of images with an image sensor and then combine the best exposed portions of those images so that the HDR image is well-exposed. However, one drawback to this approach is the possibility that motion will be introduces between the serial images. For example, a subject (e.g. person or animal) in the imaged scene or a background feature (e.g. an analog clock) may introduce motion artifacts when the serial images are combined into the HDR image. Another drawback to the known approach is that motion from hand shake by the photographer may be introduced, especially when the image sensor is included within a mobile device. Hence, reducing motion artifacts in HDR images and/or reducing the time period required to generate HDR images is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5 illustrates generating an HDR output image by merging an interpolated image and a full-resolution image, in accordance with an embodiment of the disclosure.

DETAILED DESCRIPTION

Embodiments of a system and method for generating High Dynamic Range ("HDR") images are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
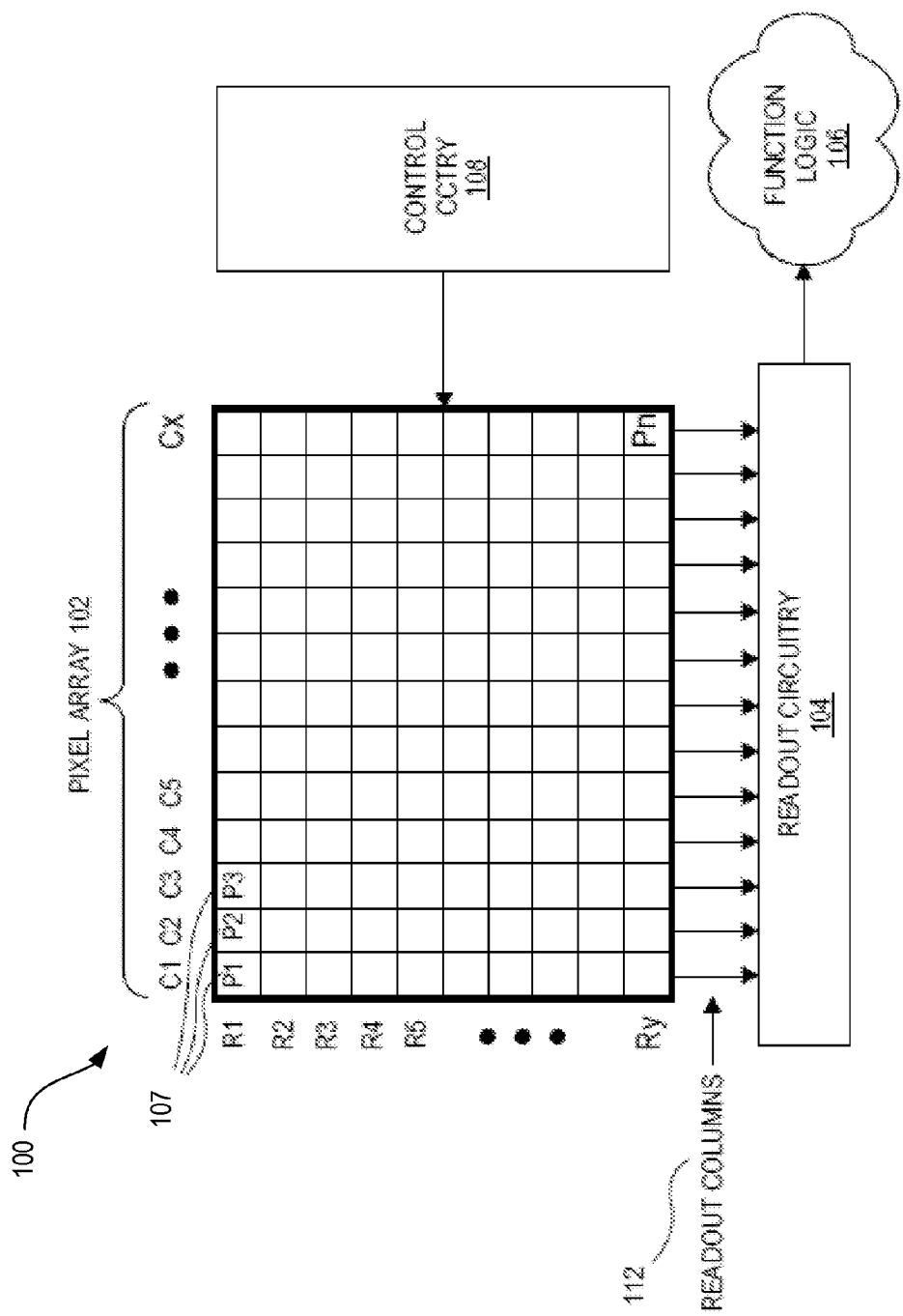
FIG. 1A is a block diagram schematic illustrating one example of an HDR imaging system, in accordance with an embodiment of the disclosure.

FIG. 1A is a block diagram schematic illustrating one example of an HDR imaging system 100, in accordance with an embodiment of the disclosure. HDR imaging system 100 includes an example pixel array 102, control circuitry 108, readout circuitry 104, and function logic 106. As shown in the depicted example, HDR imaging system 100 includes pixel array 102 which is coupled to control circuitry 108 and readout circuitry 104. Readout circuitry 104 is coupled to function logic 106. Control circuitry 108 is coupled to pixel array 102 to control operational characteristics of pixel array 102 in order to capture images generated by image light received by pixel array 102. For example, control circuitry 108 may generate a shutter signal or a plurality of shutter signals for controlling image acquisition.

In one example, pixel array 102 is a two-dimensional (2D) array of imaging sensors or pixels 110 (e.g., pixels P1, P2 . . . , Pn). In one example, each pixel 110 is a CMOS imaging pixel. As illustrated, each pixel 110 is arranged into a row (e.g., rows R1 to Ry) and a column (e.g., column C1 to Cx) to acquire image data of a person, place, object, etc., which can then be used to render an image of the person, place, object, etc.

In one example, after each pixel 110 has acquired its image data or image charge, the image data is read out by readout circuitry 104 through readout columns 112 and then transferred to function logic 106. In various examples, readout circuitry 104 may include amplification circuitry, analog-to-digital (ADC) conversion circuitry, or otherwise. Function logic 106 may simply store the image data or even manipulate the image data by applying post image effects (e.g., crop, rotate, remove red eye, adjust brightness, adjust contrast, or otherwise). In one example, readout circuitry 104 may read out a row of image data at a time along readout column lines (illustrated) or may read out the image data using a variety of other techniques (not illustrated), such as a serial read out or a full parallel read out of all pixels simultaneously. The image charge generated by different photodiodes of pixel 110 may be read out separately during different time periods.

Figure 2:
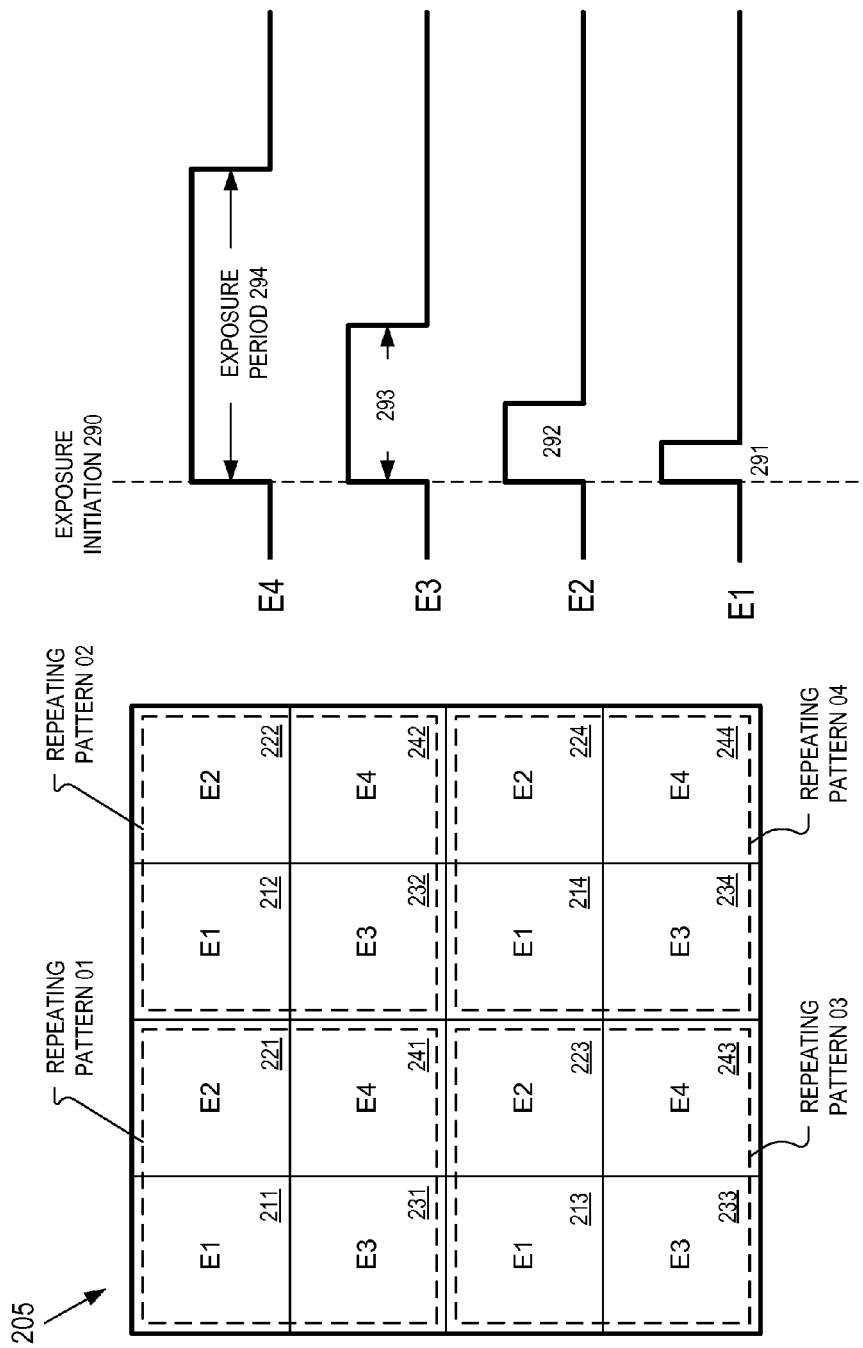
FIG. 2 illustrates a repeating pattern of pixels and exposure periods for pixels within the repeating pattern, in accordance with an embodiment of the disclosure.

FIG. 2 illustrates pixel subsection 205 having a repeating pattern of pixels, in accordance with an embodiment of the disclosure. Pixel subsection 205 illustrates the pixel arrangement that can be included in pixel array 102 of HDR imaging system 100. Repeating pattern 01 includes pixels 211, 221, 231, and 241. Pixel 211 has a first exposure period E1 291; pixel 221 has a second exposure period E2 292; pixel 232 has a third exposure period E3 293; and pixel 294 has a fourth exposure period E4 294. Pixel subsection 205 includes four instances of repeating patterns 01-04, although it is understood that pixel array 102 includes thousands if not millions of instances of the repeating pattern, depending on the resolution of pixel array 102. Pixels 211, 212, 213, and 214 are part of a first pixel subset that is interspersed in pixel array 102. Pixels 221, 222, 223, and 224 are part of a second pixel subset that is interspersed in pixel array 102. Pixels 231, 232, 233, and 234 are part of a third pixel subset that is interspersed in pixel array 102. Pixels 241, 242, 243, and 244 are part of a fourth pixel subset that is interspersed in pixel array 102. The first, second, third, and fourth pixel subsets are interspersed in pixel array 102 in accordance with their repeating patterns, as illustrated.

To capture an image, control circuitry 108 independently initiates a shutter signal to each pixel subset. Each exposure period 291-294 starts at exposure initiation 290, as shown in FIG. 2. In one embodiment, the fourth exposure period 294 is twice the duration of the third exposure period 293, the third exposure period 293 is twice the duration of the second exposure period 292, and the second exposure period 292 is twice the duration of the first exposure period 291. Exposure periods with different durations may be used.

Figure 3:
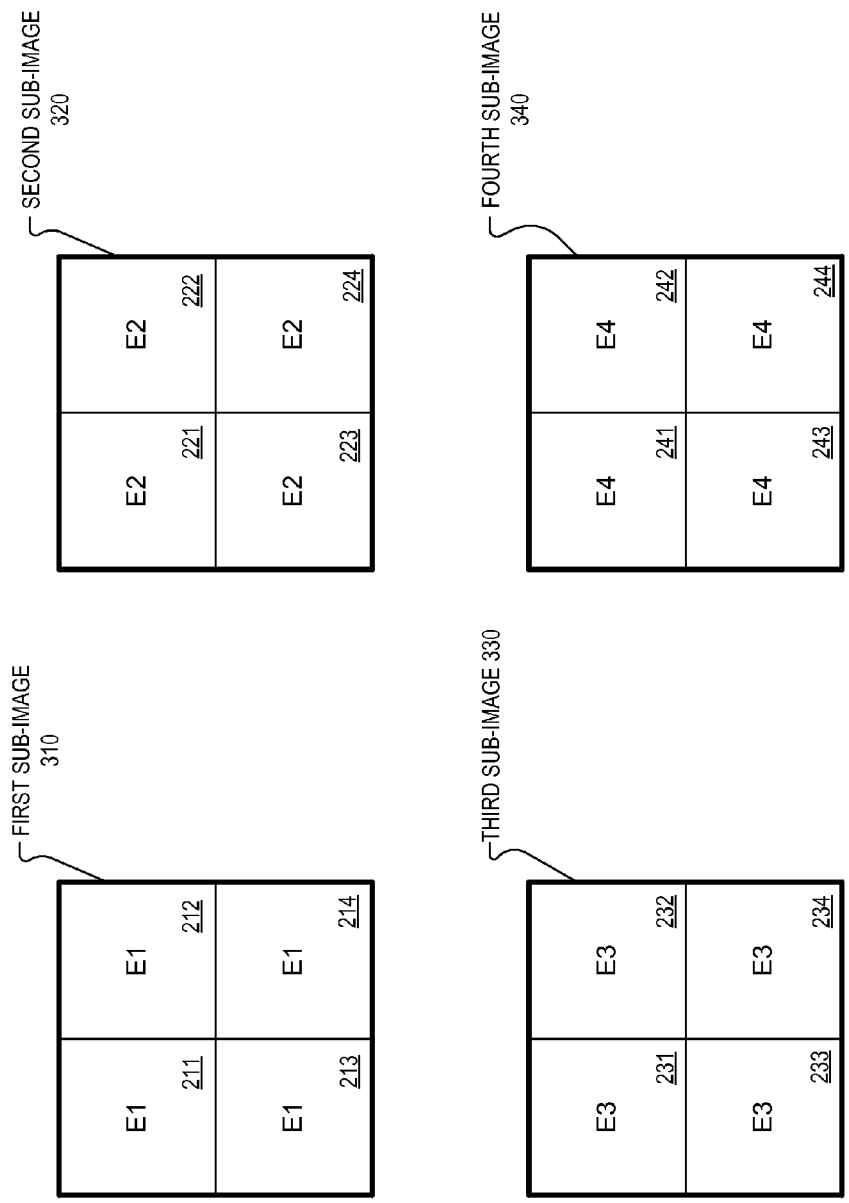
FIG. 3 illustrates four sub-images generated using different exposure periods, in accordance with an embodiment of the disclosure.

FIG. 3 shows that four sub-images are generated at the different exposure periods. More specifically, the first pixel subset captures a first sub-image 310 at the first exposure period E1 291; the second pixel subset captures a second sub-image 320 at the second exposure period E2 292; the third pixel subset captures a third sub-image 330 at the third exposure period E3 293; and the fourth pixel subset captures a fourth sub-image 340 at the fourth exposure period E4 294. It is appreciated that the sub-images in FIG. 3 are limited to four pixels for ease of illustration, but that the sub-images will generally include 25% of the pixels in pixel array 102. For example, in an 8 Megapixel image sensor, each sub-image would be 2 Megapixels.

Figure 1B:
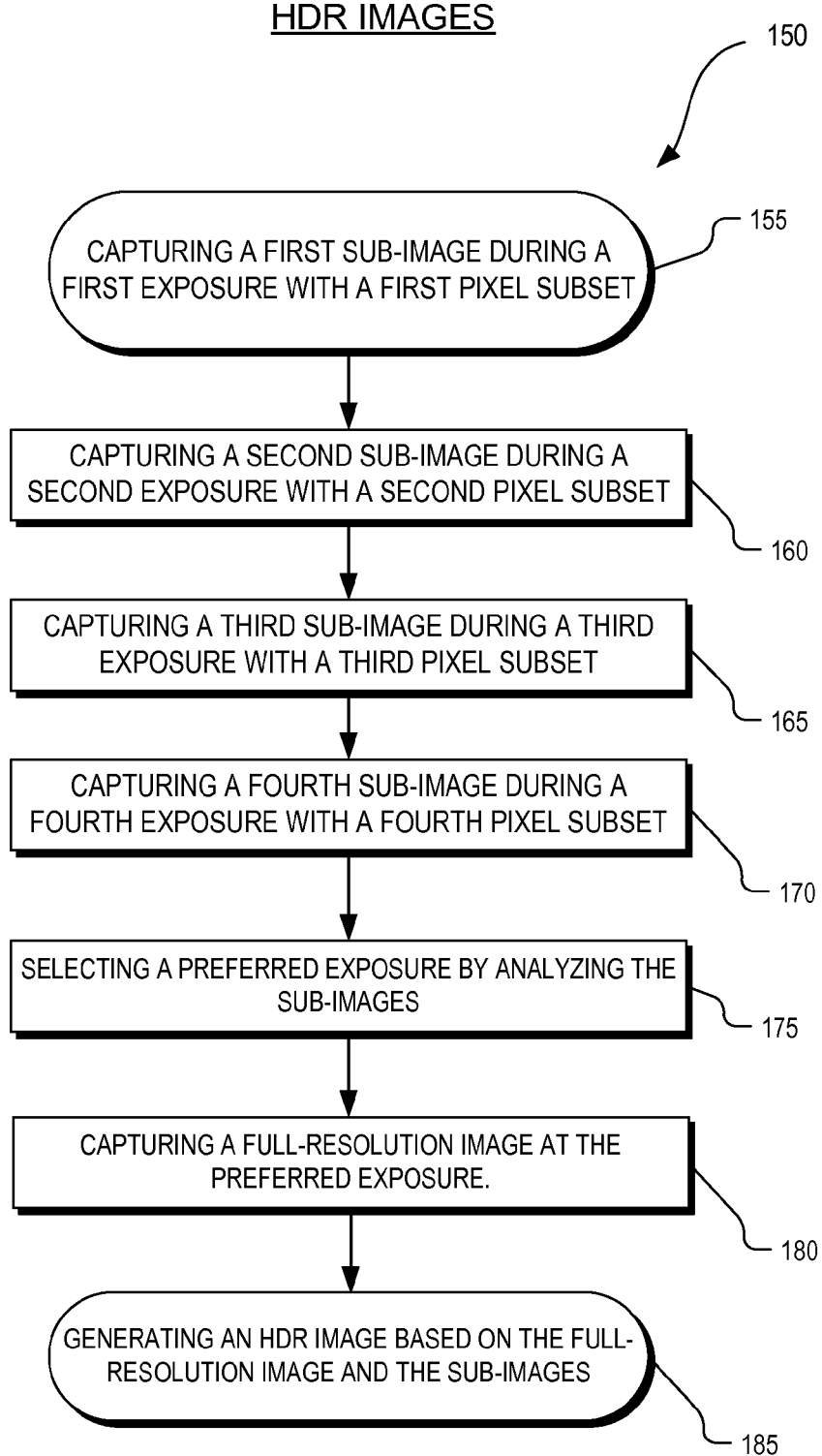
FIG. 1B illustrates a method of generating HDR images with the HDR imaging system of FIG. 1A, in accordance with an embodiment of the disclosure.

FIG. 1B illustrates a method 150 of generating HDR images with the pixel subsection 205 illustrated in FIG. 2, in accordance with an embodiment of the disclosure. The order in which some or all of the process blocks appear in process 150 should not be deemed limiting. Rather, one of ordinary skill in the art having the benefit of the present disclosure will understand that some of the process blocks may be executed in a variety of orders not illustrated, or even in parallel. Process 150 may be implemented by an image signal processor within function logic 106.

In process block 155, a first sub-image (e.g. sub-image 310) is captured with the first pixel subset during a first exposure period. A second sub-image (e.g. sub-image 320) is captured with the second pixel subset during a second exposure period, in process block 160. In process block 165, a third sub-image (e.g. sub-image 330) is captured with the third pixel subset during a third exposure period. And, a fourth sub-image (e.g. sub-image 340) is captured with the fourth pixel subset during a fourth exposure period, in process block 170. Process blocks 155, 160, 165, and 170 have some temporal overlap as their exposure periods start at the same exposure initiation time 290. Control circuitry 108 is coupled to the pixel subsets to independently control the exposure periods 291-294.

In process block 175, a preferred exposure is selected between the first, second, third, and fourth exposure periods by analyzing the first, second, third, and fourth sub-images. The preferred exposure is selected based on desired image properties such as exposure and balance. For example, exposures that are too dark or too bright (blown out) are not generally desirable for capturing images. The sub-images may be analyzed using circuitry (e.g. image signal processor) in function logic 106, for example. In one embodiment, histograms are generated for each of the sub-images and the histograms are analyzed to determine the preferred exposure. Histograms provide a graphical representation of the pixel values in a given image. Some histograms graph the darkest pixel values at the far left, while the brightest pixel values are graphed at the far right, which leaves the medium pixel values in the middle of the histogram. Hence, the sub-image that generates a histogram with most pixel values in a pre-determined middle-range of pixel values may be the sub-image, and thus the exposure, selected as the preferred exposure. Selecting the preferred exposure may include using other selection criteria that doesn't necessarily include histograms.

Process 150 continues to process block 180 after process block 175. In process block 180, a full-resolution image is captured at the preferred exposure period selected in process block 175. The full-resolution image is captured at the preferred exposure by all the pixels in the first, second, third, and fourth pixel subsets simultaneously. Therefore, in an embodiment where the sub-images are 2 Megapixels, the full-resolution image is 8 Megapixels. Since the full-resolution image is captured very shortly after capturing the sub-images (and after selecting the preferred exposure), the full-resolution image benefits from the exposure analysis (e.g. histogram analysis) of the sub-images while also providing a full-resolution image. The full-resolution image should have the most desirable exposure level of the sub-images.

Figure 4A:
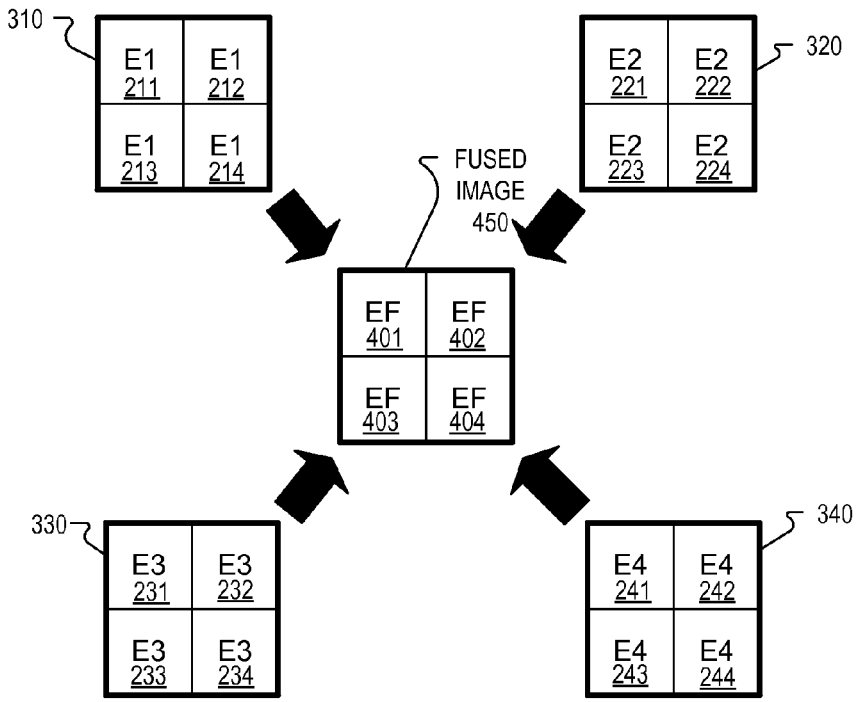
FIG. 4A illustrates fusing four sub-images into a fused image, in accordance with an embodiment of the disclosure.

In process block 185, an HDR image is generated based on the full-resolution image and the original sub-images. As part of generating an HDR image in process block 185, process 150 may perform the function illustrated in FIG. 4A. FIG. 4A illustrates fusing four sub-images 310, 320, 330, and 340 into a fused image 450, in accordance with an embodiment of the disclosure. Fused image 450 has the same resolution as one of the sub-image. That is, if the sub-images are 2 Megapixels, fused image 450 would also be 2 Megapixels. Fused image 450 is a well-exposed and a well-balanced image generated based on sub-images 310, 320, 330, and 340 that have different exposures. Exposure Fusion methods that combine images that have common subjects but different exposure times are known in the art. During the fusing process of this disclosure, a weight map 460 is generated that accounts for the contribution of each sub-image at each pixel location of fused image 450. Therefore, each pixel value in fused image 450 has a corresponding weight map represented by Equation 1:

$$E_f = W_1 E_1 + W_2 E_2 + W_3 E_3 + W_4 E_4$$

where $E_f$ is the pixel value at a given pixel of the fused image, $E_1$, $E_2$, $E_3$, and $E_4$ represent the pixel value of the first, second, third, and fourth sub-images 310-340 at the pixels of the sub-images that are aligned to correspond with the given pixel of the fused image, and $W_1$, $W_2$, $W_3$, and $W_4$ represent the contribution of each of the pixels of the respective sub-image to the given pixel of the fused image. Put differently, each pixel in repeating pattern 01 contributes to the pixel value of a pixel (pixel 401 in FIG. 4A) in fused image 450 and $W_1$, $W_2$, $W_3$, and $W_4$ represent the weight of those contributions. Each pixel in repeating pattern 02 contributes to the pixel value of a pixel (pixel 402 in FIG. 4A) and so on.

Figure 4B:
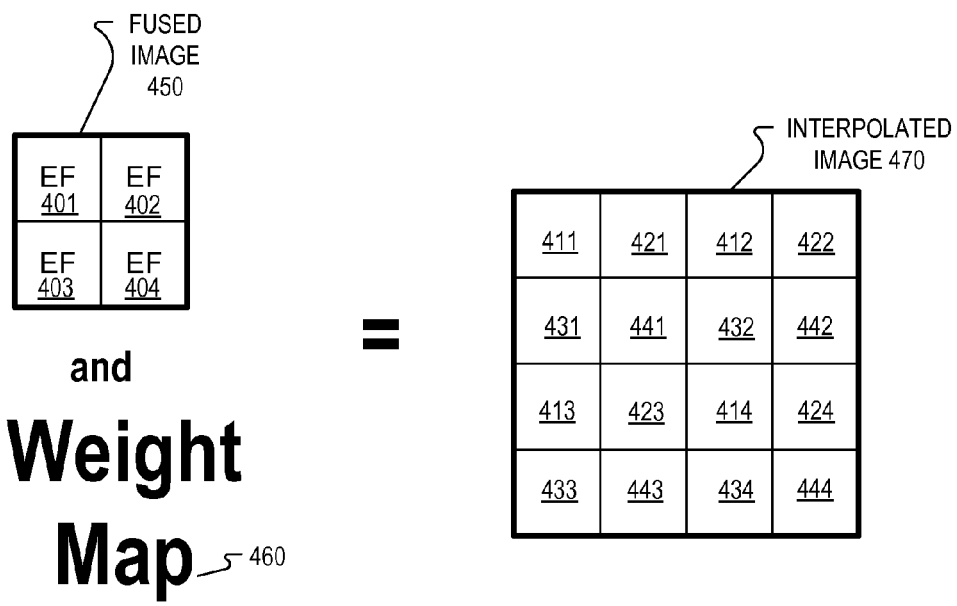
FIG. 4B illustrates generating an interpolated image using a fused image and a weight map, in accordance with an embodiment of the disclosure.

After the function illustrated in FIG. 4A, process 150 continues on to the function illustrated in FIG. 4B. FIG. 4B illustrates generating an interpolated image 470 using fused image 450 and weight map 460, in accordance with an embodiment of the disclosure. Weight map 460 includes the weight maps for each pixel of fused image 450, as presented in Equation 1. Interpolated image 470 will have four times the resolution of fused image 450. Generating interpolated image 470 may include a variety of interpolation techniques, including bilinear, bicubic, or more sophisticated interpolation methods. To illustrate an example bilinear interpolation method, pixel 411 of interpolated image 470 would retain the pixel value of pixel 401 of fused image 450; pixel 412 of interpolated image 470 would retain the pixel value of pixel 402 of fused image 450; pixel 413 of interpolated image 470 would retain the pixel value of pixel 403 of fused image 450; and pixel 414 of interpolated image 470 would retain the pixel value of pixel 404 of fused image 450. Numerically, the pixel value of pixel 411 would be given by Equation 2:

$$y^{01} = W_1^{01} x_1^{01} + W_2^{01} x_2^{01} + W_3^{01} x_3^{01} + W_4^{01} x_4^{01}$$

where $y^{01}$ is the pixel value of pixel 411, $x_1^{01}$ is the pixel value of the first pixel subset (pixel 211 in the illustrated embodiment) from repeating pattern 01, $W_1^{01}$ is the contribution of the pixel value of the first pixel subset from repeating pattern 01, $x_2^{01}$ is the pixel value of the second pixel subset (pixel 212 in the illustrated embodiment) from repeating pattern 01, $W_2^{01}$ is the contribution of the pixel value of the second pixel subset from repeating pattern 01, $x_3^{01}$ is the pixel value of the third pixel subset (pixel 213 in the illustrated embodiment) from repeating pattern 01, $W_3^{01}$ is the contribution of the pixel value of the third pixel subset from repeating pattern 01, $x_4^{01}$ is the pixel value of the fourth pixel subset (pixel 214 in the illustrated embodiment) from repeating pattern 01, and $W_4^{01}$ is the contribution of the pixel value of the fourth pixel subset from repeating pattern 01.

Similarly, the pixel value of pixel 412 of interpolated image 470 would be given by Equation 3:

$$y^{02} = W_1^{02} x_1^{02} + W_2^{02} x_2^{02} + W_3^{02} x_3^{02} + W_4^{02} x_4^{02}$$

where $y^{02}$ is the pixel value of pixel 412, $x_1^{02}$ is the pixel value of the first pixel subset (pixel 221 in the illustrated embodiment) from repeating pattern 02, $W_1^{02}$ is the contribution of the pixel value of the first pixel subset from repeating pattern 02, $x_2^{02}$ is the pixel value of the second pixel subset (pixel 222 in the illustrated embodiment) from repeating pattern 02, $W_2^{02}$ is the contribution of the pixel value of the second pixel subset from repeating pattern 02, $x_3^{02}$ is the pixel value of the third pixel subset (pixel 223 in the illustrated embodiment) from repeating pattern 02, $W_3^{02}$ is the contribution of the pixel value of the third pixel subset from repeating pattern 02, $x_4^{02}$ is the pixel value of the fourth pixel subset (pixel 224 in the illustrated embodiment) from repeating pattern 02, and $W_4^{02}$ is the contribution of the pixel value of the fourth pixel subset from repeating pattern 02.

Hence, to utilize a bilinear interpolation, the pixel value for pixel 421 in interpolated image 470 is given by Equation 4:

$$y^k = \tfrac{1}{2} \{ W_1^{01} x_1^{01} + W_3^{01} x_3^{01} + W_4^{01} x_4^{01} + W_1^{02} x_1^{02} + W_3^{02} x_3^{02} + W_4^{02} x_4^{02} + (W_2^{01} + W_2^{02}) * E_k \}$$

where $y^k$ is the interpolated pixel value of interpolated pixel 421 between pixels 411 and 412 and $E_k$ is the pixel value of the pixel positioned where the interpolated pixel 421 would be positioned when the sub-images were captured. In other words, in this particular example, $E_k$ is the pixel value of pixel 221 because pixel 221 occupies the position that the interpolated pixel 421 would have when the sub-images 310-340 were captured (See FIG. 2).

After the function illustrated in FIG. 4B, process 150 continues on to the function illustrated in FIG. 5. FIG. 5 illustrates generating an HDR output image 590 by merging interpolated image 470 and full-resolution image 580, in accordance with an embodiment of the disclosure. To merge interpolated image 470 and full-resolution image 580, a motion mask is applied to corresponding pixels of interpolated image 470 and full-resolution image 580. Since interpolated image 470 and full-resolution image 580 have the same resolution, each pixel in interpolated image 470 has a corresponding pixel in full-resolution image 580 that occupies the same position. For example, the pixel at the upper left corner of interpolated image 470 has a corresponding pixel in the upper left corner of full-resolution image 580.

A variety of motion masks may be applied in the merging of interpolated image 470 and full-resolution image 580. In one example, a Zero Mean Normalized Cross-Correlation ("ZNCC") function is applied to the corresponding pixels. As is known in the art, a ZNCC function generates larger values when the images are close matches while generating lower values when the image are not as similar. When the motion mask is below a motion threshold, more weight is assigned to an interpolated pixel than a corresponding full-resolution pixel in final HDR output image 590, when merging interpolated image 470 and full-resolution image 580. The motion threshold is a value of the ZNCC function, in one embodiment. When the motion mask reaches or exceeds the motion threshold, more weight is assigned to an interpolated pixel than a corresponding full-resolution pixel in final HDR output image 590, when merging interpolated image 470 and full-resolution image 580. When the motion mask reaches or exceeds the motion threshold, it is an indication that full-resolution image 580 (which was captured subsequent to the sub-image 310-340) included a substantial amount of motion from the time passing between the capture of the sub-image 310-340 and the full-resolution image. Thus, the pixel values of final HDR output image 590 favor the pixel values of interpolated image 470 which are based on the sub-images that were captured closer to the initiation of the image capture that began with capturing the sub-images. This weighting of the interpolated image (based on the originally captured sub-images 310-340) and the full-resolution image 580 (captured subsequent to the sub-images) combats motion artifacts in final HDR output image 590 by preferring the originally captured sub-image pixel values when the full-resolution image includes an unacceptable amount of motion. However, when the subsequent full-resolution image includes an acceptable amount of motion the HDR image pixels benefits from the contribution of the preferred exposure of the full-resolution image.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of generating an image, the method comprising:
    capturing a first sub-image during a first exposure with a first pixel subset of an image sensor;
    capturing a second sub-image during a second exposure with a second pixel subset of the image sensor, the second exposure being longer than the first exposure;
    capturing a third sub-image during a third exposure with a third pixel subset of the image sensor, the third exposure longer than the second exposure;
    capturing a fourth sub-image during a fourth exposure with a fourth pixel subset of the image sensor, the fourth exposure longer than the third exposure, wherein the first, second, third, and fourth pixel subsets are disposed in a repeating pattern, and wherein the first, second, third, and fourth exposure periods start at a same initiation time;
    selecting a preferred exposure between the first, second, third and fourth exposures by analyzing the first, second, third, and fourth sub-images;
    capturing a full-resolution image at the preferred exposure, wherein the full-resolution image is captured by the first, second, third, and fourth pixel subsets simultaneously; and
    generating a final HDR output image based on the sub-images and the full-resolution image.

2. The method of claim 1 further comprising:
    fusing the first, second, third, and fourth sub-images to generate a fused image;
    generating a weight map of contributions of the sub-images to the fused image at each pixel location of the fused image;
    generating an interpolated image by interpolating the fused image and the weight map, wherein the interpolated image has the same resolution as the full-resolution image; and
    merging the interpolated image with the full-resolution image to generate the final HDR output image.

3. The method of claim 2, wherein merging the interpolated image with the full-resolution image includes:
    applying a motion mask to corresponding pixels of the interpolated image and the full-resolution image;
    assigning more weight to an interpolated pixel of the interpolated image than a corresponding full-resolution pixel of the full-resolution image in the final HDR output image when the motion mask is below a motion threshold; and
    assigning more weight to the full-resolution pixel of the full-resolution image than the corresponding interpolated pixel of the interpolated image in the final HDR output image when the motion mask reaches or exceeds the motion threshold.

4. The method of claim 3, wherein the motion mask includes applying a Zero Mean Normalized Cross-Correlation ("ZNCC") function to the corresponding pixels.

5. The method of claim 2, wherein said interpolating the fused image and the weight map includes using a bilinear interpolation.

6. The method of claim 1, wherein analyzing the first, second, third, and fourth sub-images includes analyzing histograms of the first, second, third, and fourth sub-images.

7. An imaging system comprising:
    a pixel array including a first, second, third, and fourth pixel subset interspersed in a repeating pattern;
    control circuitry coupled to independently initiate first, second, third, and fourth exposures of the first, second, third, and fourth pixel subsets to capture first, second, third, and fourth sub-images, respectively;
    a non-transitory machine-accessible storage medium that provides instructions that, when executed by the imaging system, will cause the imaging system to perform operations comprising:
        capturing a first sub-image during a first exposure with a first pixel subset of an image sensor;
        capturing a second sub-image during a second exposure with a second pixel subset of the image sensor, the second exposure being longer than the first exposure;
        capturing a third sub-image during a third exposure with a third pixel subset of the image sensor, the third exposure longer than the second exposure;
        capturing a fourth sub-image during a fourth exposure with a fourth pixel subset of the image sensor, the fourth exposure longer than the third exposure, wherein the first, second, third, and fourth pixel subsets are disposed in a repeating pattern, and wherein the first, second, third, and fourth exposure periods start at a same initiation time;
        selecting a preferred exposure between the first, second, third and fourth exposures by analyzing the first, second, third, and fourth sub-images;
        capturing a full-resolution image at the preferred exposure, wherein the full-resolution image is captured by the first, second, third, and fourth pixel subsets simultaneously; and
        generating a final HDR output image based on the sub-images and the full-resolution image.

8. The imaging system of claim 7, wherein the non-transitory machine-accessible storage medium further provides instructions that, when executed by the imaging system, will cause the imaging system to perform operations comprising:
    fusing the first, second, third, and fourth sub-images to generate a fused image;
    generating a weight map of contributions of the sub-images to the fused image at each pixel location of the fused image;
    generating an interpolated image by interpolating the fused image and the weight map, wherein the interpolated image has the same resolution as the full-resolution image; and
    merging the interpolated image with the full-resolution image to generate the final HDR output image.

9. The imaging system of claim 8, wherein merging the interpolated image with the full-resolution image includes:
    applying a motion mask to corresponding pixels of the interpolated image and the full-resolution image;
    assigning more weight to an interpolated pixel of the interpolated image than a corresponding full-resolution pixel of the full-resolution image in the final HDR output image when the motion mask is below a motion threshold; and assigning more weight to the full-resolution pixel of the full-resolution image than the corresponding interpolated pixel of the interpolated image in the final HDR output image when the motion mask reaches or exceeds the motion threshold.

10. The imaging system of claim 9, wherein the motion mask includes applying a Zero Mean Normalized Cross-Correlation ("ZNCC") function to the corresponding pixels.

11. The imaging system of claim 8, wherein said interpolating the fused image and the weight map includes using a bilinear interpolation.

12. The imaging system of claim 7, wherein analyzing the first, second, third, and fourth sub-images includes analyzing histograms of the first, second, third, and fourth sub-images.

13. A non-transitory machine-accessible storage medium that provides instructions that, when executed by an imaging system, will cause the imaging system to perform operations comprising:

capturing a first sub-image during a first exposure with a first pixel subset of an image sensor of the imaging system;

capturing a second sub-image during a second exposure with a second pixel subset of the image sensor, the second exposure being longer than the first exposure;

capturing a third sub-image during a third exposure with a third pixel subset of the image sensor, the third exposure longer than the second exposure;

capturing a fourth sub-image during a fourth exposure with a fourth pixel subset of the image sensor, the fourth exposure longer than the third exposure, wherein the first, second, third, and fourth pixel subsets are disposed in a repeating pattern, and wherein the first, second, third, and fourth exposure periods start at a same initiation time;

selecting a preferred exposure between the first, second, third and fourth exposures by analyzing the first, second, third, and fourth sub-images;

capturing a full-resolution image at the preferred exposure, wherein the full-resolution image is captured by the first, second, third, and fourth pixel subsets simultaneously; and generating a final HDR output image based on the sub-images and the full-resolution image.

14. The non-transitory machine-accessible storage medium of claim 13, further providing instructions that, when executed by the imaging system, will cause the imaging system to perform further operations, comprising:

fusing the first, second, third, and fourth sub-images to generate a fused image;

generating a weight map of contributions of the sub-images to the fused image at each pixel location of the fused image;

generating an interpolated image by interpolating the fused image and the weight map, wherein the interpolated image has the same resolution as the full-resolution image; and merging the interpolated image with the full-resolution image to generate the final HDR output image.

15. The non-transitory machine-accessible storage medium of claim 14, wherein merging the interpolated image with the full-resolution image includes:

applying a motion mask to corresponding pixels of the interpolated image and the full-resolution image;

assigning more weight to an interpolated pixel of the interpolated image than a corresponding full-resolution pixel of the full-resolution image in the final HDR output image when the motion mask is below a motion threshold; and assigning more weight to the full-resolution pixel of the full-resolution image than the corresponding interpolated pixel of the interpolated image in the final HDR output image when the motion mask reaches or exceeds the motion threshold.

16. The non-transitory machine-accessible storage medium of claim 15, wherein the motion mask includes applying a Zero Mean Normalized Cross-Correlation ("ZNCC") function to the corresponding pixels.

17. The non-transitory machine-accessible storage medium of claim 14, wherein said interpolating the fused image and the weight map includes using a bilinear interpolation.

18. The non-transitory machine-accessible storage medium of claim 13, wherein analyzing the first, second, third, and fourth sub-images includes analyzing histograms of the first, second, third, and fourth sub-images.

* * * * *